United States Patent [19]
Ullmann et al.

[11] 3,731,043
[45] May 1, 1973

[54] DIGITAL CIRCUIT FOR AN ERODING MACHINE

[75] Inventors: Werner Ullmann, Locarno-Muralto, Switzerland; Rudolf Panschow, Hannover, Germany; Volker Suhr, Neustadt a./Ruebenberge, Germany; Wolfgang Meyer, Hannover, Germany; Arno Sieg, Locarno; Laszlo Rabian, Locarno-Monti, both of Switzerland

[73] Assignee: Agie, A.G. fur industrielle Elektronik, Losone-Locarno, Switzerland

[22] Filed: June 7, 1971

[21] Appl. No.: 150,511

[30] Foreign Application Priority Data
June 24, 1970 Switzerland..........................9594

[52] U.S. Cl. .............................................219/69 V
[51] Int. Cl. ...........................................B23p 1/12
[58] Field of Search.................................219/69 V

[56] References Cited

UNITED STATES PATENTS

| | | | |
|---|---|---|---|
| 2,974,216 | 3/1961 | Inoue | 219/69 V |
| 3,475,578 | 10/1969 | Vasiliev et al. | 219/69 V |
| 3,591,761 | 7/1971 | Bederman et al. | 219/69 V |

*Primary Examiner*—R. F. Staubly
*Attorney*—Whittemore, Hulbert & Belknap

[57] ABSTRACT

This invention relates to a digital circuit for an eroding machine designed to control a relative movement between a workpiece and a wire electrode by the input of data stored in an information carrier, the said data being translated in a circuit into the curve defined by the axis of the wire electrode in consideration of the diameter of the wire electrode and the width of the operation gap.

10 Claims, 5 Drawing Figures

Patented May 1, 1973

INVENTORS
WERNER ULLMANN
RUDOLF PANSCHOW
VOLKER SUHR
WOLFGANG MEYER
ARNO SIEG
LASZLO RABIAN

BY Whittemore Hulbert & Belknap

ATTORNEYS

Patented May 1, 1973

INVENTORS
WERNER ULLMANN
RUDOLF PANSCHOW
VOLKER SUHR
WOLFGANG MEYER
ARNO SIEG
LASZLO RABIAN

BY *Whittemore Hulbert & Belknap*

ATTORNEYS

Patented May 1, 1973

INVENTORS
WERNER ULLMANN
RUDOLF PANSCHOW
VOLKER SUHR
WOLFGANG MEYER
ARNO SIEG
LASZLO RABIAN
BY
*Whittemore Hulbert & Belknap*
ATTORNEYS

DIGITAL CIRCUIT FOR AN ERODING MACHINE

In the known programme controlled electric eroding machines either a shaped electrode or a wire electrode is employed. On an information carrier, which may be a punched tape, the data of the workpiece shapes to be produced are recorded in the known manner. An electrical circuit controls the shaped or wire electrode in accordance with such data. This numerical control is used mainly for guiding a wire electrode. Since complex workpiece shapes, such as punching tools or gears for the watch industry, the optical industry and apparatus construction should be produced by a wire electrode, correspondingly great demands must be made of the numerical control. This applies particularly to opening up further applications for the numerically controlled wire electrode. These great demands cannot be met with the known control system since their basic conception cannot be extended without complicating the various components and increasing production costs.

It is one object of this invention to create a basic conception of digital control on the construction block principle of which the various components are of simple design and cheap to manufacture, additional components for special erosive problems being capable of being readily included and, respectively, connected in the basic conception. This involves not only the conical "cutting" of workpieces but the simplification of programming for repetitive curves or congruent curve portions of which a path curve may be formed.

According to this invention not only the data for the desired workpiece configuration or workpiece contour are to be used, which are translated into the wire axis path of the wire electrode, but also further data for the control of electrical parameters e.g. current, voltage, repetition frequency, width, interval between impulses and/or double impulses and, respectively, ignition impulses) of the erosion generator or generators and for the control of the flushing properties of the dielectric liquid.

Since it is well known that the operating conditions during the erosive treatment change owing to the uncontrolled conditions in the operating gap, a further additional component in the circuit according to this invention enables optimum control of the relative movement between the wire electrode axis and the workpiece to be achieved in consideration of the conditions in the operating gap.

The invention is characterized by:

a circuit which generates signals for the path curve and the setting of a certain angle between the axis of the wire electrode and the surface of the workpiece following the data of the information carrier;

at least one interpolator which calculates the path curve of the axis of the wire electrode and its angular position by virtue of the said signals according to a predetermined programme, and supplies control signals, by means of an interpolation process, to the driving motors of at least one advancing device;

return memories which return the wire electrode along the same path curve by a certain length when trouble occurs in the operating gap, and a circuit for transmitting the data for the angular setting, the control of the electrical parameters to at least one erosion generator and for the control of the flushing conditions of the dielectric liquid in the operating gap.

An embodiment of the invention is disclosed in greater detail with reference to the drawings in which FIG. 1 is a perspective view of part of the advancing device consisting of a large and a small cross-table and the holding device for the wire electrode;

The design of an electrical eroding machine being generally known, no details will be given thereof.

Figure 1:
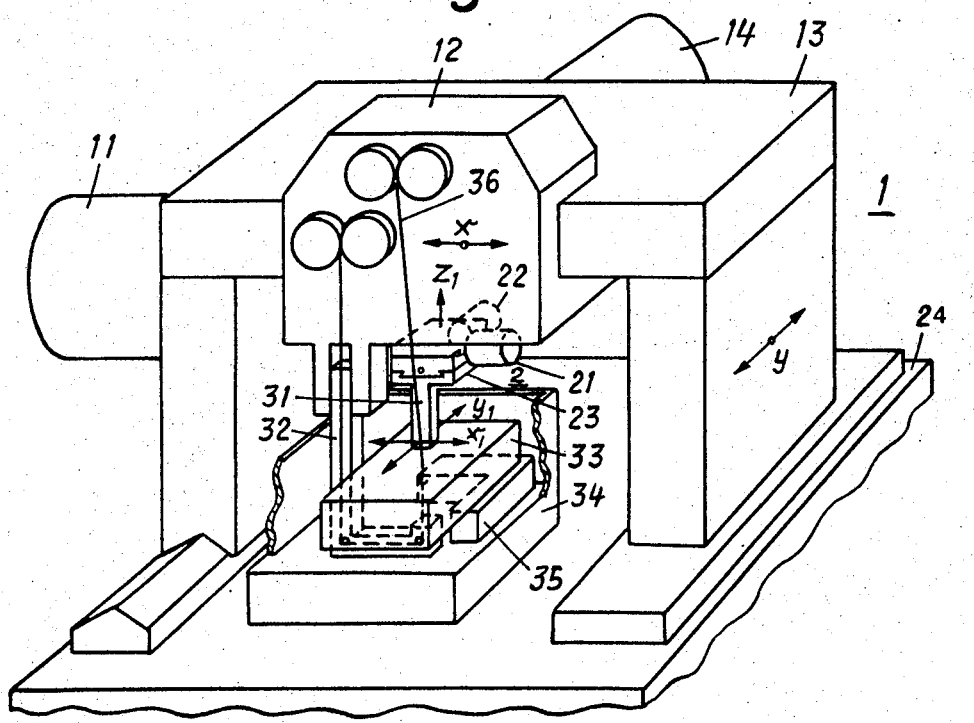
Figure 5:
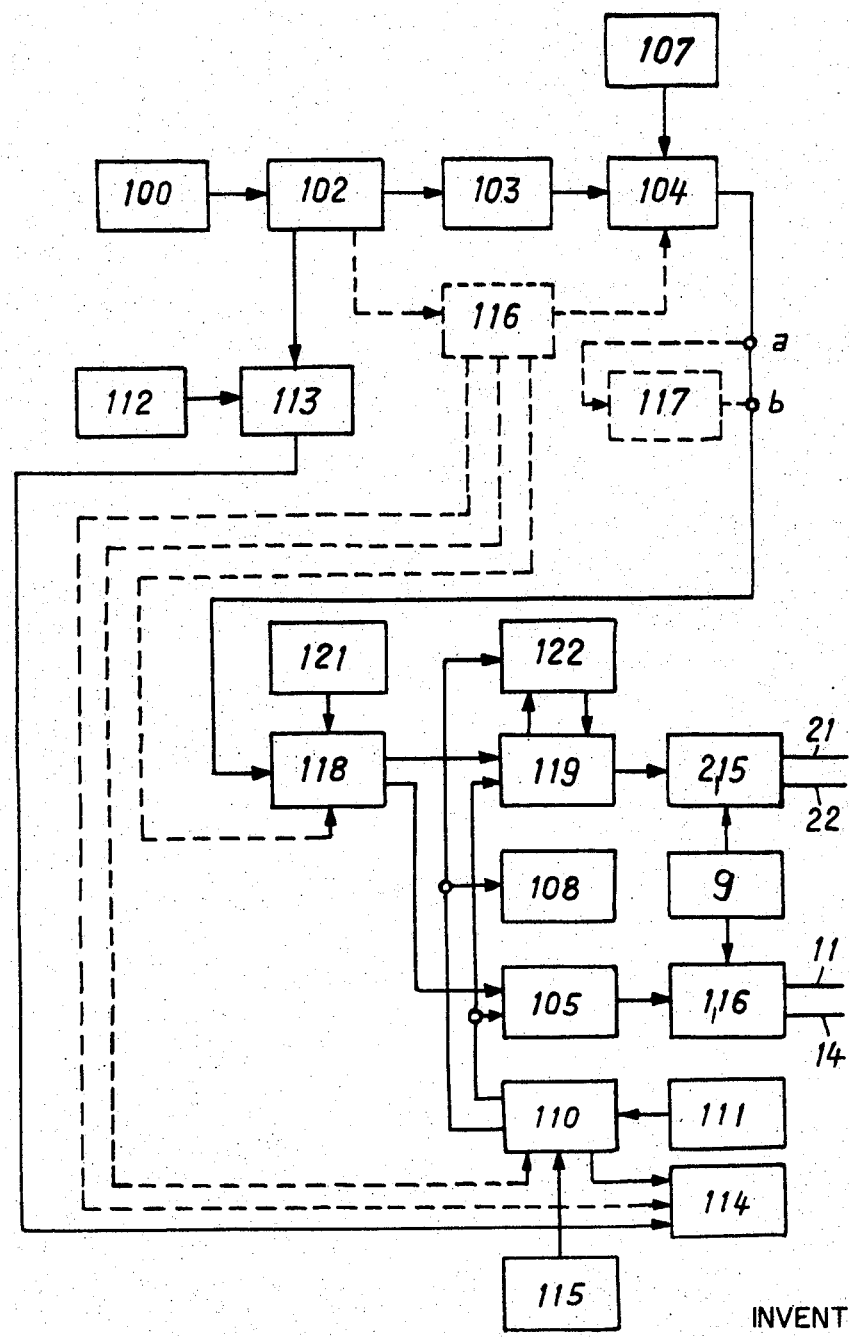
FIG. 5 shows the digital circuit with boxed elements.

According to FIG. 1, the cross-table is arranged on the base-plate 2 so as to be displaceable in the direction of the y-co-ordinate. Displacement is effected by the driving motor 11 connected to the outlet of the circuit shown in FIG. 5. The mobile unit 12 displaceable in the direction of the x-co-ordinate is arranged on the yoke 13. Displacement is effected by the driving motor 14 which is connected to the outlet of the circuit shown in FIG. 5. The second cross-table 2 is attached to the part 12 of the first cross-table 1 and can be displaced on the three co-ordinates $x_1$, $y_1$ and $z_1$. For the sake of simplicity, only the driving motors 21, 22 for the displacement on the co-ordinates $x_1$, $y_1$ are indicated. The displacement in the z-axis is indicated by the arrow $z_1$. Attached to the part 22 of the second small cross-table 2 is the wire guide 31 which is arranged above the workpiece 33. Attached to the portion 12 of the first cross-table 1 is the other wire guide 32 which is arranged underneath the workpiece 33. The workpiece 33 is clamped on a base 35 in the container 34 in the known manner. For the erosive processing of the workpiece 33, a dielectric liquid is provided in the container 34. As is well known, the wire electrode 36 consists of a wire of 20 to 100 m length which is wound on and unwound, respectively, from coils (not shown). The wire electrode moves in one direction during the erosive processing operation as known, and is guided by appropriate guide rollers, merely indicated in FIG. 1, that the wire electrode is taut between the two wire guides 31, 32 and that it cuts the desired shape or contour out of the workpiece 33. The movements necessary therefor are performed by the driving motors 11 and 14 of the first cross-table. The wire electrode 36 in the example shown in FIG. 1 forms a right angle with the surface of the workpiece. In that position the wire electrode cuts e.g. cylindrical faces. FIG. 5 shows the digital circuit which appropriately controls the driving motors 11, 14 on the basis of the path curve data which the wire electrode is to follow. This will be explained later. With the example so far described, any path curves can be run with the wire electrode The path curves may also be generated if the wire electrode 36 is stationary and the workpiece 33 is moved by the cross-table 1. What is decisive, then, is only the relative movement between the wire electrode and the workpiece. Accordingly, the explanations regarding the movement of the wire electrode with a stationary workpiece similarly apply to the movement of the workpiece 33 with a stationary wire electrode. However, the example here described does not enable oblique cutting faces to be obtained as are required in bevel gears or punching tools. To that end, the holding device of the wire electrode 36 with its one wire guide 31 is arranged on the second small cross-table. By appropriate displacement by means of the driving motors 21, 22 on the co-ordinates $x_1$ and/or $y_1$ the wire electrode 36 is angularly adjusted relative to the surface of the workpiece 33. The movements necessary to obtain the desired angular adjustment are controlled through data, which are either stored in the information memory or may be supplied manually, by the circuit according to FIG. 5. This will later be described in greater detail with reference to FIGS. 3 and 5. It is also readily possible for the wire electrode 32 to be displaceable while the wire electrode 31 is stationary. Again, both electrodes may be jointly displaceable. The displacement of the second small cross-table 2 on the $z_1$-co-ordinate is useful when the spacing between the two wire guides 31, 32 is to be changed. This will be described in greater detail with reference to FIG. 3. Accordingly, any path curve can be obtained with the embodiment disclosed, the cut faces of the shape or contour cut from the workpiece having conical surfaces. The angle of the said conical cut faces may be changed during erosion so that surfaces with varying conicity are produced.

Figure 2:
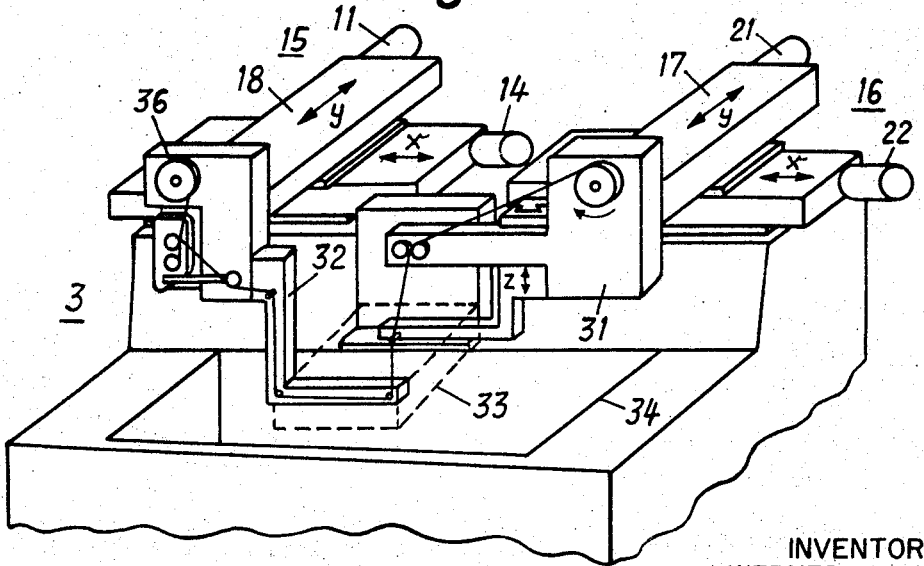
FIG. 2 is a perspective view of another embodiment of the advancing device with two cross-tables of the same dimensions.

FIG. 2 shows two large cross-tables 15, 16 each of which can be displaced on the two co-ordinates $x$ and $y$. For a better understanding the driving motors of the cross-table 15 are designated by 11 and 14 and the driving motors of the cross-table 16 by 21 and 22. These driving motors are connected to the similarly designated outlets of the circuit of FIG. 5. The holding device 3 for the wire electrode 36 is so arranged that one wire guide 31 located above the workpiece 33 is attached to portion 17 of the cross-table 16 which is displaceable in the y-direction while the wire guide located underneath the workpiece 33 is attached to the portion of the cross-table 15 displaceable in the y-direction. The wire guide 31 can be displaced in the z-direction. Displacement may be effected either manually or by a further driving motor. The control impulses from the circuit according to FIG. 5 move the wire electrode of the embodiment according to FIG. 2 in such a manner that both wire guides 31, 32 are displaced in the same direction. No relative movement of the two wire guides in respect of one another occurs in this case. In this case the driving motors 11, 14, 21, 22 are connected in parallel to the outlets 11, 14 of the circuit according to FIG. 5. In order to obtain a relative movement of the two wire guides 31, 32 and thus to set an angle of the wire electrode relative to the workpiece surface 33, the driving motors 11, 14, 21, 22 are connected in parallel to the outlets 11, 14, 21, 22 of the circuit of FIG. 5 so that the driving motors obtain control signals for both the path curve and for the conicity and, respectively, angular position. The conicity may be varied during the erosion process with this embodiment as well in the event that such workpiece configurations must be cut out. As previously mentioned, the data for the angular setting are supplied to the circuit of FIG. 5 either manually or by the information carrier. The embodiment according to FIG. 2 thus operates on the same principle as that of FIG. 1 while it is different in design only.

Figure 3:
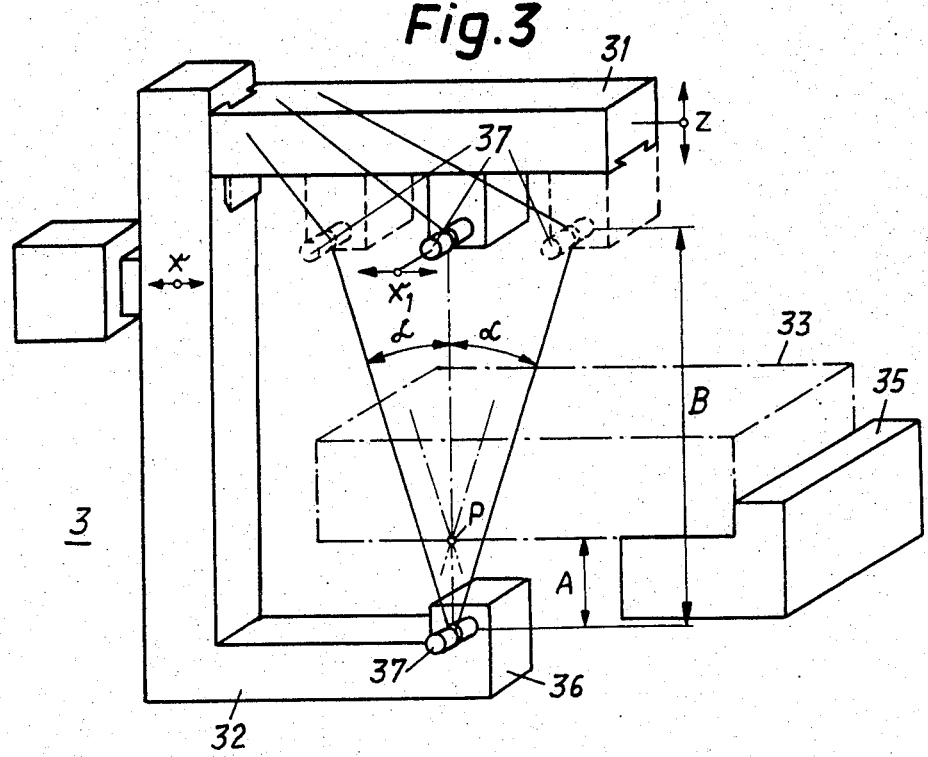
FIG. 3 is a perspective view of the two wire guides of the holding device explaining the angular setting between the wire electrode and the workpiece.

FIG. 3 is a diagrammatic view of the two wire guides 31, 32 of the holding device 3 for the wire electrode 36. Shown between the two wire guides is the workpiece 34 with the support 35. Of the directions of movement on the three co-ordinates only the $x$ and $z$-co-ordinates are shown. In order that the wire electrode 36 is positively held, the pins 37 are provided on the wire guides 31, 32. In FIG. 3 the displacement of the pins 37 of the wire guide 31 in the $x_1$-co-ordinate is shown in broken lines. This $x_1$-displacement causes the angle $\alpha$ between the wire electrode 36 and the surface of the workpiece 34 to be changed as desired. A change of angle also occurs if the distance B, which is also referred to as the gap width, is increased or decreased by displacement of the wire guide 31 on the z-co-ordinate. It is now assumed that the pin 37 is moved, from its central position, into the right-hand position so that the angle changes. This change in angle necessarily causes a change of the path curve at the upper face and at the lower face of the workpiece 34. This change of the path curves is naturally not desirable. Accordingly, a theoretical point of intersection P is assumed at e.g. the lower workpiece surface. The change in angle must therefore be effected so that the wire electrode will always pass through the point of intersection P. This is of particular importance if the angle $\alpha$ of conicity is to be changed during erosion. The multiple possibilities of displacing the wire guides 31, 32 shown in FIGS. 1 and 2 enable the condition "motion of the wire electrode on the path curve of the theoretical point of rotation P" to be met. The wire electrode traces, at a certain angular setting, two equidistant path curves on the upper and lower faces of the workpiece.

In order to have regard to the theoretical point of rotation at the lower face of the workpiece 34, the distance A is significant which indicates the distance between the lower workpiece face and the point of support of the wire electrode 36 on pin 37 of the wire arm 32. As is well known, this point of support between the wire electrode and the pin 37 is displaced when the angle $\alpha$ is varied. This error in guiding also occurs if some other device is used in place of the pins 37. Such other arrangement may, by way of example, be a funnel which is hung on gimbals from the wire guides 31, 32. This error of the wire guides is corrected manually in the circuit of FIG. 5 or by an information carrier. The gap width B amounts to e.g. 120 to 50 mm depending on the height of the workpiece. The distance A amounts to e.g. 15 mm. If a plate arranged between the workpiece 34 and the support 35, the thickness of the plate must naturally be given consideration.

Figure 4:
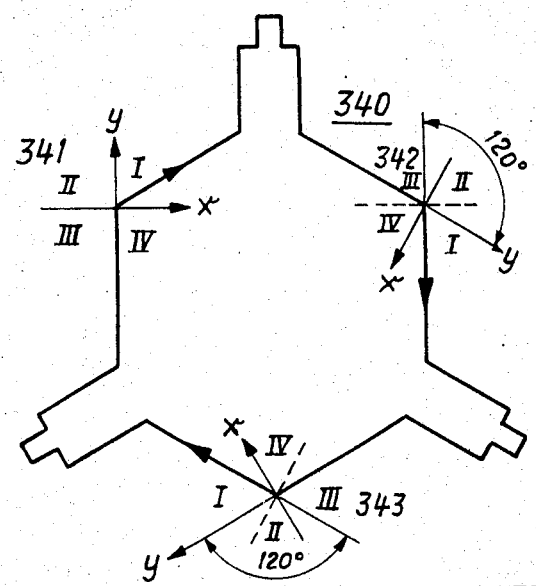
FIG. 4 shows a workpiece shape cut with the wire electrode.

FIG. 4 shows a contour 340 cut from the workpiece 34 by means of the wire electrode in accordance with the data supplied to the information carrier. It is assumed that the cut faces of the said contour are conical in some places, which is not shown in detail for greater clarity. This shape is used to explain that, with repetitive cutting shapes, a simplification of programming the circuit of FIG. 5 may be effected by turning the system of co-ordinates $x$, $y$. This rotation is effected not by means of the cross-tables of FIG. 1 and 2 but by means of a special circuit element in the arrangement of FIG. 5. The workpiece contour 340 of FIG. 4 consists of three individual contours which are spaced by 120° relative to one another. The information carrier need thus contain only the data for the path curve of an individual shape. The command to rotate the system of co-ordinates $x, y$ may be supplied to the circuit according to FIG. 5 either manually or by the same or another information carrier. According to FIG. 4 the data for the path curve of the individual contour from position 341 to position 342 are stored in the information carrier. The wire electrode 36 moves through this individual contour. In position 342 the particular circuit element effects rotation of the system of co-ordinates through 120°. When the wire electrode 36 has reached position 343, the system of co-ordinates $x, y$ is rotated through another 120°. The rotation of the system of co-ordinates $x, y$ may naturally be effected in any manner depending on which workpiece shape is to be cut with the wire electrode 36. This arrangement achieves programming for repetitive path curves or for congruent curve portions of which the path curve is composed.

The digital circuit arrangement according to FIG. 5 will now be described. Stored in the known manner in an information carrier, which may be punched tape or magnetic tape, are the data which control the relative movements between the wire electrode 36 and the workpiece 34. Obviously, data for other purpose may be stored. Such particular data will be referred to below. It is now assumed that a punched tape is employed as an information carrier of which the data are supplied in units, in the known manner, to the buffer memory 102 by the feeder 100 which is a punched-card reader in the embodiment. From this buffer memory 102 the information passes into a code converter 103 which must be provided if the data coming from the punched tape must be digitally converted. The code-converted information then passes into the circuit 104 designed as a correcting unit 104 which calculates, on the basis of the characteristic points of the desired workpiece configuration supplied by the punched-card reader 101, the corresponding characteristic points of the path of the axis of the wire electrode 36. To this end it receives, from the manual input unit 107, the values of the diameter of the wire electrode 36 and the width of the operating gap. If so desired, such data regarding wire diameter and width of the gap may be stored in the punched tape as additional information so that the manual input unit 107 can be dispensed with. This is the case, by way of example, if the wire diameter and the gap width are predetermined in the mass-production of similar workpiece contours. The output signals of the correcting units 104, which indicate the actual path curve described by the axis of the wire electrode 36, now pass to the conicity computing unit 118 which calculates the angle $\alpha$ between the wire electrode 36 and the workpiece 33. From the manual input 121 it receives the data for the gap width B which is determined by the thickness of the workpiece, the distance A and for the angle $\alpha$ (FIG. 3). The values B, A and $\alpha$ can also be stored in the punched tape as additional information. The output signals of the conicity computing unit 118 are supplied to the interpolators 105 and 119. These interpolators are of similar design. Each interpolator calculates, one the basis of the output signals, in a first section in accordance with a predetermined programme the path curve of the axis of the wire electrode 36 as well as the angle $\alpha$ of the desired conicity. A straight line, a circle, an ellipsis, a parable or the like is designated as a predetermined programme. Stored in the predetermined programme are the characteristic points of the geometrical shapes. Depending on which path curve the wire electrode 36 is to follow, the corresponding curve portions of the various geometrical shapes are composed. This is determined by the output signals from the conicity computing units 118 which may consist, e.g. for a circular path curve, of the starting and terminae points, radius and, possibly of the angle $\alpha$ of the conicity. The sections of the path curve so determined are supplied as control signals, in a second portion of the interpolators, to the driving motors 11, 14, 21, 22 by means of one of the known interpolating methods. The cross-tables associated with the said driving motors are diagrammatically shown as boxes 1, 16, 2, 15 in FIG. 5. As is well known, the interpolators operate on either the set-value storage method or the search-step method also known as iterative interpolation, or on the DDA method known as a digital differential analyzer or approximation method. For this reason no details are given in respect of the mode of operation of the second section of the interpolators by means of these interpolation methods. Each interpolator 105, 119 is equipped with memories which store the characteristic points of the path curves on the strength of the output signals of the conicity computing unit 118. If so desired, a curve section or several consecutive curve sections, which are as known combined into a path curve, can be stored. Such storage of the curve sections and, respectively, the curve section is effected for the purpose of interpolating, in the event of trouble or a short-circuit in the operating gap 111, the curve section last run by the wire electrode 36 of which the characteristic points are stored in the interpolator in reverse order so that the wire electrode 36 is returned on the path curve consisting of the curve section or composed of curve sections. The trouble in the operating gap 111 is detected by the monitoring device 110 which supplies a trouble signal to one of the inlets of the interpolators 105, 119. This trouble signal causes the interpolators not to supply any further control signals to the driving motors 11, 14, 21, 22. The wire electrode therefore discontinues its run and remains in position. The control signal further causes the stored characteristic values of the curve sections or of the curve piece to be interpolated in inverse order by the second portion of the interpolators. The control signals of that reverse interpolation are supplied to the driving motors 11, 14, 21, 22 so that the wire electrode 36 returns along the same path curve. This return motion is continued until the monitoring device 110 has found that the trouble or short-circuit in the operating gap 111 has been remedied. In that case the monitoring device 110 supplies a further signal to one inlet of the interpolators 105, 119 so that the interpolators can supply such control signals to the driving motors whereby the wire electrode 36 is caused to advance to the point where the trouble started. When everything is in order in the operating gap, erosion begins at that point so that the wire electrode can again proceed. Another embodiment of the return memories is shown, by way of example, in FIG. 5. Each interpolator 105, 119 has a return memory 108, 122 associated therewith. Each return memory stores the interpolated control signals which, as previously mentioned, are supplied to the driving motors. If trouble, such as a short-circuit, occurs in the operating gap which is detected by the monitoring device 110, the supply of control signals to the driving motors of the cross-tables is discontinued so that the wire electrode remains in its position. As previously mentioned, this is effected by a trouble signal from the monitoring device 110 to an inlet of the interpolators. The same trouble signal of the monitoring device 110, however, also passes to the inlets of the return memories 108, 122 and causes the control signals last stored to be supplied, in inverse order, to the driving motors 11, 14, 21, 22 of the cross-table. Accordingly, the wire electrode 36 returns by one or several sections of curve. It depends on the capacity of the said return memories how great the length of path curve returned may be. Normally such return memories have a limited capacity of e.g. 500 to 1,000 control signals, also designated as "steps." These steps performed by the driving motors constitute a path of 1 to 3 millimeters over which the wire electrode 36 can return. The capacity of the return memories may naturally be smaller or larger. If everything is in order in the operating gap 111, the monitoring device 110 supplies a further signal to the interpolators and the return memories so that the wire electrode advances to the position where the trouble occurred and continues to advance when erosion has again been started.

The return memories described in the above paragraph may thus be arranged in the interpolators or associated with the individual interpolators as return memories. The different characteristics of the two embodiments reside in the fact that, in the arrangement in the interpolators, the characteristic points of the path curve are stored and the steps and, respectively, the control impulses of the complete path curve to be returned calculated and that the separate return memory stores the various steps or control impulses of the complete path curve to be returned. The capacity of the return memory must be substantially larger for a certain length of the "return path curve" than for "reverse interpolation." The return memory is therefore employed in the cases where only a few steps of the driving motors are necessary for the return of the wire electrode 36. The use of the return memory may therefore be regarded as economical. In "reverse interpolation" the length of the "return path curve" is virtually unlimited. While only the return memories 108, 122 are shown in FIG. 5, it is pointed out that "reverse interpolation" is also within the scope of this invention.

In order to control the processes so far described in connection with FIG. 5, the computing clock generator 113 is provided. For reasons of simplification the limiting lines have not been entered in FIG. 5. The computing clock generator is supplied, from the punched card reader 100 and via the buffer memory 102, with the data important for control, such as "positioning of the wire electrode at the beginning of the cut," "programme start," "programme finish," "interruption" and data relating to the type of interpolation and the like. This additional information from the punched tape, which are also supplied to the diagrammatically shown erosion generator 114, may be modified by manual input.

The additional information such as diameter of the wire electrode 36, width of the working gap 111, gap width B, distance A, angle α, adjustment or changing the electrical parameters at the erosion generator (s) 114 may, as previously mentioned, be stored in the information carrier. In that case a circuit arrangement 116 is provided which obtains the additional information from the buffer memory 102 and passes it on to the correcting computing unit 104, the conicity computing unit 118, the erosion generators 114 and the monitoring device 110. In the event that data for the variation of the flushing conditions of the dielectric liquid in the working gap 111 are provided in the information carrier, such information passes, via an arrangement 116, to an appropriate device which should also be symbolically accommodated in the box 114. The manual inputs 107, 112, 121 previously described may be completely or partially replaced or complemented the arrangement 116.

The monitoring device 110 has one of its inlets connected to the operating gap 111 and determines the conditions in the said operating gap on the basis of the voltage or the current or the frequency. This monitoring device supplies appropriate control impulses to the interpolators 105, 119 for the control of the feed rate of the wire electrode 36. The monitoring device also influences the electrical parameters, such as current, voltage, repetition frequency, width, intervals of impulses and/or double impulses or ignition impulses at or to the erosion generators 114. The flushing conditions are also influenced by the monitoring device. The monitoring device 110 can be complemented by the manual input 115.

Provided in the connecting line between the correcting computing unit 104 and the conicity computing unit 118 is a circuit 117 which converts the characteristic data of a curve section and, respectively, an individual contour (FIG. 4) into the curve sections rotated by a certain angle. This process may be repeated several times as per a punched-tape input. This greatly simplifies the programming of curves. The indexing unit 117 is indicated in broken lines between the points a and b of the connecting line, which signifies that this indexing unit can be selectively switched into the connection. The electronic indexing unit is known from data processing technology and therefore requires no explanation.

The wire need not be guided into certain path curves on carthesian co-ordinates only. Polar co-ordinates may readily be employed.

What is claimed is:

1. A digital circuit for an eroding machine for the control of a relative movement between a workpiece and a wire electrode by supplying data stored in an information carrier which are converted in a circuit into the path curve defined by the axis of the wire electrode in consideration of the diameter of the wire electrode and the width of the operating gap, characterized by, a circuit which generates signals for the path curve and the setting of a certain angle between the axis of the wire electrode and the surface of the workpiece following the data of the information carrier, at least one interpolator which calculates the path curve of the axis of the wire electrode and its angular position by virtue of the said signals according to a predetermined program and supplies control signals, by means of an interpolation process, to driving motors of at least one advancing device, return memories which return the wire electrode along the same path curve by a certain length when trouble occurs in the operating gap, and a circuit for transmitting the data for the angular setting, the control of the electrical parameters to at least one erosion generator, and for control of the flushing conditions of the dielectric liquid in the operating gap.

2. A circuit according to claim 1 characterized by the fact that the circuit which converts the data representing the workpiece configuration in consideration of the diameter of the wire electrode and the width of the operating gap into corrected data for the path curve, is connected to one of a manual input and the circuit for the purpose of supplying the wire diameter and the gap width data.

3. A circuit according to claim 1 characterized by the fact that the memory means are designed as return memories and that a return memory is associated with each interpolator, each such return memory being so set that it will store the control signals which pass, from the associated interpolator, to the driving motors, stop the control signals supplied by the interpolator by a trouble signal, and supply the control impulses of the last length of the path curve in reverse order to the driving motors so that the wire electrode will return by a certain length.

4. A circuit according to claim 1 characterized by the fact that the memory means in each interpolator are arranged to store the characteristic points of the path curve and are so set that, in the presence of a trouble signal from a monitoring device, which interrupts the supply of control signals from the interpolator for the further erosive operation of the wire electrode, it interpolates the stored characteristic points in reverse order and supplies them to the driving motors so that the wire electrode will return by a certain length.

5. A circuit according to claim 1 characterized by the fact that a monitoring device is provided which, in the event of changes of conditions in the operating gap, influences the electrical parameters of the erosion generator, the return memories, and the interpolators.

6. A circuit according to claim 1 characterized by the fact that an indexing unit is arranged between the correcting computing unit and the conicity computing unit for the purpose of displacing the system of coordinates.

7. A circuit according to claim 1 characterized by the fact that the advancing device consists of a first cross-table displaceable on two coordinates for the advance of the wire electrode on the path curve corrected in consideration of the diameter of the wire electrode and the width of the operating gap, and a second cross-table displaceable on at least two coordinates for the angular setting, the second cross-table being arranged on a portion of the first cross-table which is displaceable on one coordinate.

8. A circuit according to claim 7 characterized by the fact that the second cross-table has attached to it a holding device for the wire electrode with wire guides arranged above and underneath the workpiece, the two wire guides being displaceable relative to one another.

9. A circuit according to claim 8 characterized by the fact that one wire guide of the holding device is arranged on the first cross-table while the second wire guide is arranged on the second cross-table.

10. A circuit according to claim 1 characterized by a holding device for the wire electrode comprising wire guides arranged one above and one underneath the workpiece, the upper wire guide being attached to a first cross-table displaceable on at least two coordinates while the other wire guide is attached to a second cross-table displaceable on two coordinates.

* * * * *